US009852137B2

(12) United States Patent
Mann et al.

(10) Patent No.: US 9,852,137 B2
(45) Date of Patent: Dec. 26, 2017

(54) CONTAINER STORAGE MIGRATION

(71) Applicant: International Business Machines Corporation, Armonk, NY (US)

(72) Inventors: Vijay Mann, Bangalore (IN); Shripad J. Nadgowda, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/862,786

(22) Filed: Sep. 23, 2015

(65) Prior Publication Data

US 2017/0083541 A1 Mar. 23, 2017

(51) Int. Cl.
*G06F 12/00* (2006.01)
*G06F 17/30* (2006.01)
*G06F 3/06* (2006.01)

(52) U.S. Cl.
CPC ........ *G06F 17/30079* (2013.01); *G06F 3/065* (2013.01); *G06F 3/0619* (2013.01); *G06F 3/0647* (2013.01); *G06F 3/0665* (2013.01); *G06F 3/0685* (2013.01); *G06F 3/0604* (2013.01); *G06F 3/067* (2013.01); *G06F 3/0629* (2013.01)

(58) Field of Classification Search
CPC ............. G06F 17/30079; G06F 3/0604; G06F 3/0619; G06F 3/0629; G06F 3/0647; G06F 3/065; G06F 3/0665; G06F 3/067
USPC ............................... 711/162; 709/212; 713/2
See application file for complete search history.

(56) References Cited

U.S. PATENT DOCUMENTS 8,380,674 B1 * 2/2013 Bolen ................... G06F 3/0617 707/657
8,423,731 B1 * 4/2013 Nadathur ............ G06F 11/1461 707/640
8,850,432 B2 9/2014 McGrath et al.
2014/0195490 A1 7/2014 Leverett et al.

OTHER PUBLICATIONS

Wikipedia, OpenVZ, https:en.wikipedia.org/wiki/Jan. 5, 2016, pp. 1-5.
Flocker 1.0, Container Data Management for Docker-Cluster HQ, Jan. 5, 2016, pp. 1-5.

(Continued)

*Primary Examiner* — Mardochee Chery
(74) *Attorney, Agent, or Firm* — Ryan, Mason & Lewis, LLP

(57) ABSTRACT

Methods, systems, and computer program products for container storage migration are provided herein. A computer-implemented method includes provisioning a copy-on-write union filesystem on the target host with (i) one or more network filesystem-mounted directories from the source host set to read-only and (ii) at least one directory set to read-write; identifying one or more files that have been (i) updated by a given container and (ii) copied over by the copy-on-write union filesystem; removing the one or more identified files from a directory path on the target host; copying, from the source host into the directory path on the target host, each of one or more files that have not been updated by the given container; merging the copy-on-write union filesystem and the directory path on the target host; and initiating the given container on the target host based on the merging.

20 Claims, 6 Drawing Sheets

(56) References Cited

OTHER PUBLICATIONS

CRIU. www.criu.org/, Jan. 5, 2016, pp. 1-3.
Jelastic, https://jelastic.com/, DevOps PaaS and Container-Based IaaS, Enterprise PaaS for Developers, 2016, pp. 1-16.
Open Container Initiative, https://www.opencontainer.org/, 2015, pp. 1-2.
OpenStack Open Source Cloud Computing Software, https://www.openstack.org/, Hear OpenStack Use Cases from Sky UK, Banco Santander and BBVA at the Barcelona Summit, Oct. 2016, pp. 1-10.
Racemi, www.racemi.com/, Cloud Migration Software-Server Migration Software, 2015, pp. 1-2.
ZFS Filesystem, http://zfsonlinux.org/, Wikipedia, Jan. 5, 2016, pp. 1-25.
Almond et al. Introduction to Workload Partition Management in IBM AIX Version 6.1. IBM Redbooks, 2007.
Amazon Inc. Amazon Web Services. Wikipedia, https://en.wikipedia.org/wiki/Amazon_Web_Services, pp. 1-8, Jan. 5, 2016.
Apache Inc. Marathon, https://mesosphere.github.io/marathon/, Marathon: A Cluster-Wide Init and Control System for Services in cgroups or Docker Containers, 2015, pp. 1-2.
Bradford et al., Live wide-area migration of virtual machines including local persistent state. In Proceedings of the 3rd international conference on Virtual execution environments, pp. 169-179. ACM, 2007.
Cloud Foundry, Warden, https://docs.cloudfoundry.org/concepts/architecture/warden.html, Jan. 5, 2016, pp. 1-3.
Cluster HQ. Flocker, https://docs.clusterhq.com/en/1.0.3/, Flocker documentation, Jan. 5, 2016, pp. 1-4.
Alex Polvi, CoreOs is Building a Container Runtime, rkt, CoreOs, Rocket, https://coreos.com/blog/rocket/, Dec. 1, 2014, pp. 1-7.
Docker, Understand how Docker Works and How You Can Use it, https://www.docker.com/, Jan. 5, 2016, pp. 1-8.
EMC Inc. ScaleIO, Wikipedia, https://en.wikipedia.org/wiki/EMC_ScaleIO, Jan. 6, 2016, pp. 1-4.
Hines et al., Post-copy based live virtual machine migration using adaptive pre-paging and dynamic self-ballooning. In Proceedings of the 2009 ACM SIGPLAN/SIGOPS international conference on Virtual execution environments, pp. 51-60. ACM, 2009.
IBM Bluemix—Next Generation Cloud App Development Platform, https://console.ng.bluemix.net/, pp. 1-4, Jan. 6, 2016.
Kamp et al., Jails: Confining the omnipotent root. In Proceedings of the 2nd International SANE Conference, vol. 43, p. 116, 2000.
Alexey Kopytov. Sysbench manual. MySQL AB, 2012.
Wikipedia, System Center Virtual Machine Manager, https://en.wikipedia.org/wiki/System_Center_Virtual_Machine_Manager, Jan. 6, 2016, pp. 1-2.
Mirkin et al., Containers checkpointing and live migration. In Proceedings of the Linux Symposium, pp. 85-92, 2008.
Nadgowda et al., 12map: Cloud disaster recovery based on image-instance mapping. In Middleware 2013, pp. 204-225. Springer, 2013.
Surie et al., Low-bandwidth vm migration via opportunistic replay. In Proceedings of the 9th workshop on Mobile computing systems and applications, pp. 74-79. ACM, 2008.
Travostino et al., Seamless live migration of virtual machines over the man/wan. Future Generation Computer Systems, 22(8):901-907, 2006.
Tucker et al., Solaris zones: Operating system support for server consolidation. In Virtual Machine Research and Technology Symposium, 2004.
Velte et al., Microsoft virtualization with Hyper-V. McGraw-Hill, Inc., 2009.
WMware Inc. vCenter Converter, Enterprise-Class Migration Tool for Converting Physical Machines to VMware Virtual Machines, 2009, pp. 1-2.
Virtual Machine Live Migration with vMotion: VMware, VMware India, www.vmware.com/in/products/vsphere/features/vmotion, 2016, pp. 1-6.

* cited by examiner

CONTAINER STORAGE MIGRATION

FIELD

The present application generally relates to information technology, and, more particularly, to virtualization technologies.

BACKGROUND

Containers are used as a virtualization choice due to, for example, being lightweight, as well as incorporating density, elasticity, and rapid provisioning. Containers are also being adopted as a capability to build platform as a service (PaaS) and software as a service (SaaS) cloud solutions.

Additionally, virtual machines (VMs) can encapsulate a complete operating state into a single virtual disk (vDisk). Migration of VMs commonly involves moving or copying vDisks between servers. Different vendors utilize different vDisk formats and provide proprietary live migration capabilities. Further, migrating VMs across hypervisors require explicit vDisk conversions.

Containers persist their states in directories on a host filesystem such as root filesystems (rootfs) and data volumes. Accordingly, container migration is primarily a file-based process which involves moving data directories from a source to a target host. Also, containers are commonly implemented to run a single application process. Therefore, unlike VMs, installing migration agents into containers is discouraged, and the migration capabilities required for container clouds are different than for VM clouds.

Existing migration approaches attempt to migrate and/or provision containers without moving storage, which can result in poor performance and/or deployment of storage migration methods that require long container downtimes.

SUMMARY

In one embodiment of the present invention, techniques for container storage migration are provided. An exemplary computer-implemented method for migrating a container from a source host to a target host can include steps of provisioning a copy-on-write union filesystem on the target host with (i) one or more network filesystem-mounted directories from the source host set to read-only and (ii) at least one directory set to read-write; identifying one or more files that have been (i) updated by a given container and (ii) copied over by the copy-on-write union filesystem; removing the one or more identified files from a directory path on the target host; copying, from the source host into the directory path on the target host, each of one or more files that have not been updated by the given container; merging the copy-on-write union filesystem and the directory path on the target host; and initiating the given container on the target host based on the merging.

In another embodiment of the invention, an exemplary computer-implemented method can include steps of creating a write-able directory on a local filesystem; mounting the write-able directory with a network filesystem directory exported from a host source, wherein the network filesystem directory is mounted as read-only; creating a layered filesystem on a container, wherein the layered filesystem comprises (i) a single layer that is write-able and (ii) one or more additional layers that are each read-only; establishing a symbolic link on the single layer that is write-able in the layered filesystem to the mounted network filesystem directory; and instantiating the container based on the symbolic link.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes container storage migration. At least one embodiment of the invention includes creating and implementing a filesystem-agnostic and vendor-agnostic migration service for a container cloud which ensures minimum downtime.

An example embodiment of the invention includes migrating direct and network attached storage (NAS) data for containers from a source host to a target host by generating filesystem-agnostic remote snapshots. Such an embodiment can include using an advanced multi-layered unification filesystem (AUFS) and/or a network filesystem (NFS) to take a snapshot of and migrate a directory from one host to another (remote) host. Additionally, directories to be migrated on the source host can be exported over a NFS, and new directories can be created on the target host for receiving new writes.

One or more embodiments of the invention can also include providing a copy-on-write (COW) union filesystem for replicating data on a target host with NFS-mounted directories set to READ_ONLY and new directories set to READ_WRITE, and merging the COW directory and the final directory on the target host. Accordingly, at least one embodiment of the invention includes using multiple replication modes and/or channels for storage migration. By way of example, for an in-band virtual storage network, COW can be used to replicate the data modified by a container, and for an out-of-band virtual storage network, secure copy (scp) and/or rsync can also be used (for example) to replicate data not modified by the container.

In addition to the illustrative embodiments detailed herein, one or more embodiments of the invention can be implemented in technical contexts such as storage migration for direct attached storage (DAS), storage migration for NAS in a hybrid environment, and storage management during a cloud burst (a hybrid cloud). Moreover, while one or more examples embodiments are described herein within the context of the Docker platform, it should be appreciated by one skilled in the art that embodiments of the invention can be implemented within the context of additional platforms and/or container technologies.

Figure 1:
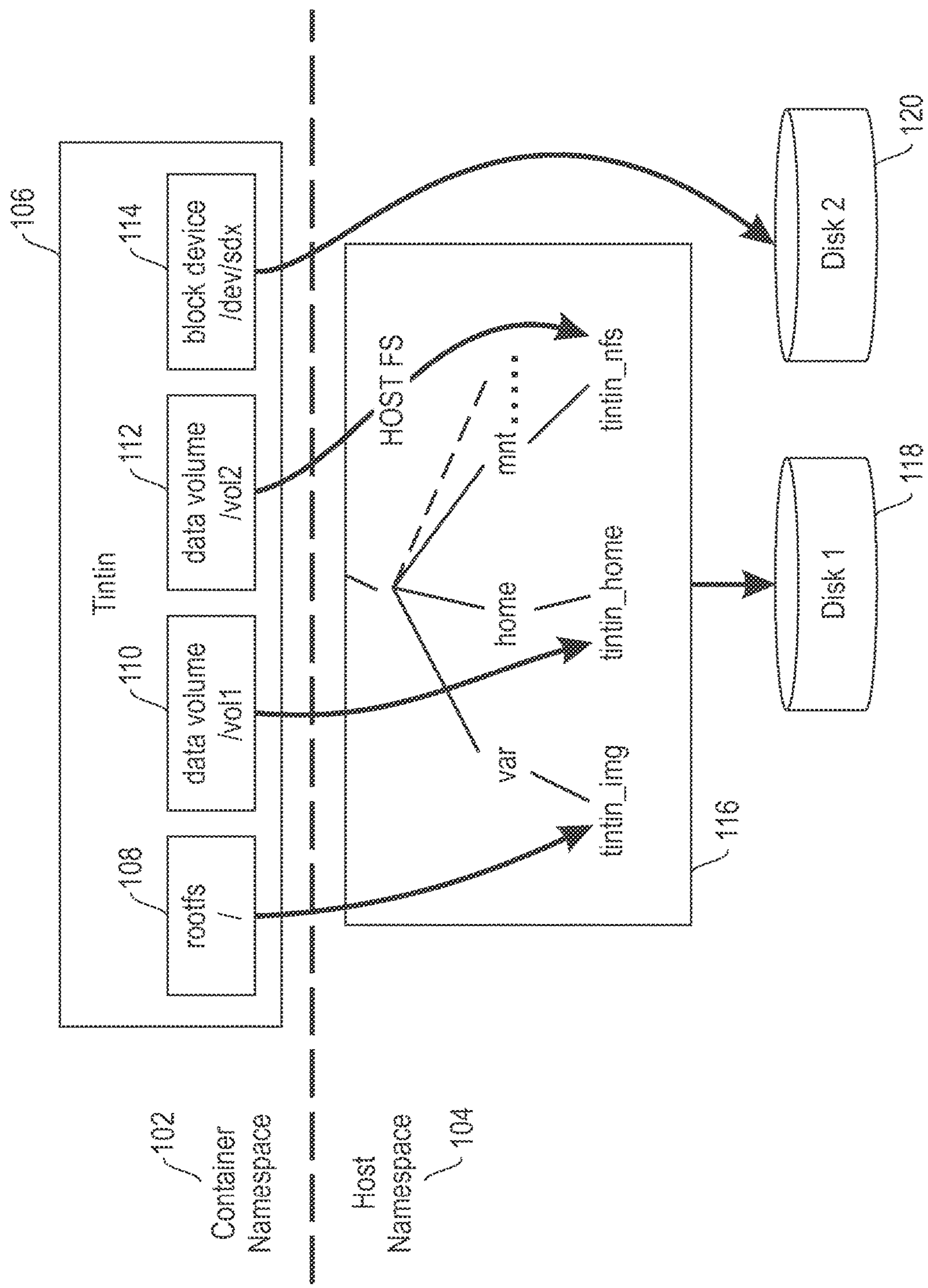
FIG. 1 is a diagram illustrating container-to-host storage mapping, according to an embodiment of the invention.

FIG. 1 is a diagram illustrating container-to-host storage mapping, according to an embodiment of the invention. By way of illustration, FIG. 1 depicts a container namespace 102, a host namespace 104, a first disk (Disk1) 118 and a second disk (Disk2) 120. Disk1 118 and Disk2 120 can include, for example, direct-attached disks on the host and/or storage area network (SAN) volumes attached to the host. Accordingly, in one or more embodiments of the invention, Disk1 118 and Disk2 120 represent block devices on the host. Additionally, FIG. 1 illustrates that containers can have and/or store different types of data stores, such as rootfs, data volumes, and block devices. For migrating a container, each type of data store is moved to the target host. Additionally, as used here, a rootfs refers to an ephemeral storage of a container, which can include a copy of an image from which the container is created. Data volumes, as used herein, are designed to persist data, independent of the container's life cycle. Also, as depicted in FIG. 1, one or more embodiments of the invention can include mapping block devices (a disk, partition, etc.) such as component 114 (/dev/sdx) from a host inside a container.

For every container a new rootfs is created which is a copy of an image from which the container is created. This rootfs can include, for example, a directory on the host filesystem. For example, FIG. 1 depicts that for container "tintin" 106, its rootfs 108 is mapped to host directory /var/tintin_img on the host filesystem (FS) 116. As used herein, "tintin" is simply the name of the container illustrated in FIG. 1, and all associated storage resources are tagged with the name. The rootfs 108 is deleted when the container 106 is destroyed. Thus, in such an example embodiment, rootfs 108 is not intended to be used as a data store to persist critical application data.

Data volumes (that is, directories from the host filesystem which are mapped or mounted inside a container) are commonly designed to persist data, independent of the container's life cycle. Accordingly, in one or more embodiments of the invention, data volumes are used as a primary data store for applications. FIG. 1 depicts a /home/tintin_home directory from the host FS 116 mounted as data volume 110 (/vol1) inside container 106. NFS mounted directory /mnt/tintin_nfs on the host FS 116 is also mapped inside container 106 as data volume 112 (/vol2). In one or more embodiments of the invention, migrating such data volumes can include mounting the data volumes on the target host and mapping the data volumes inside a container.

FIG. 1 also depicts mapping block devices (disk, partition) from the host FS 116 inside the container 106, as shown in via block device 114 (/dev/sdx).

Figure 2:
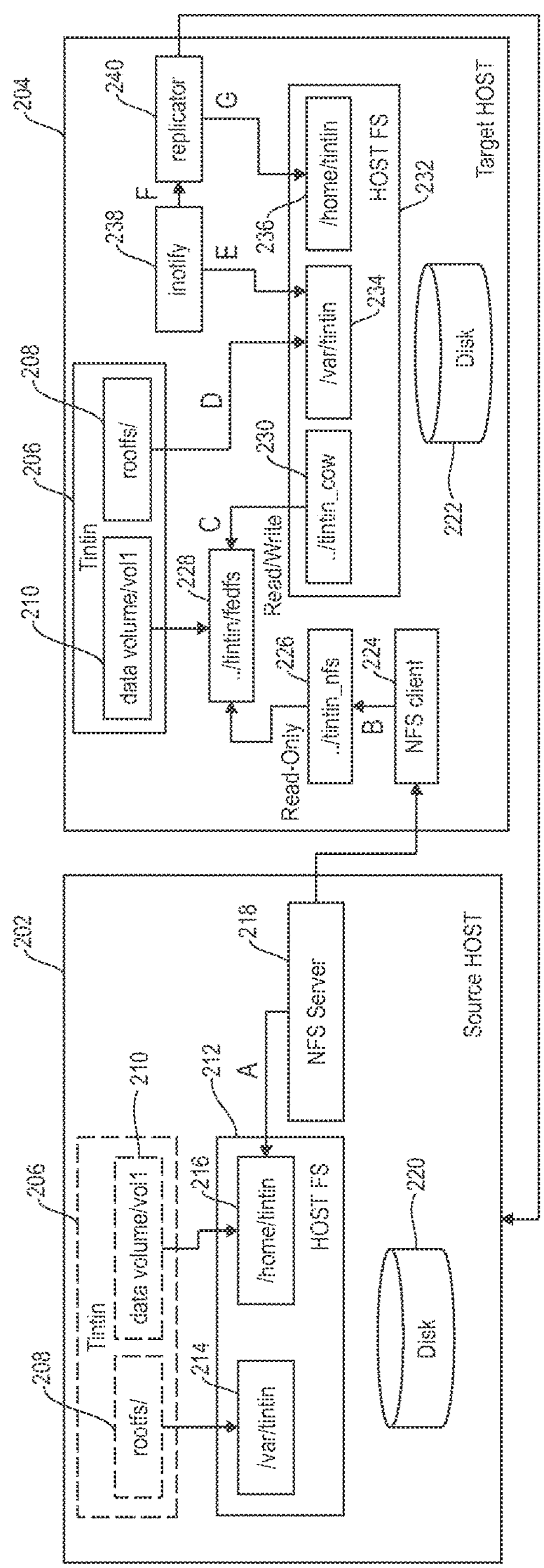
FIG. 2 is a diagram illustrating container-to-host storage mapping, according to an example embodiment of the invention.

FIG. 2 is a diagram illustrating container-to-host storage mapping, according to an example embodiment of the invention. By way of illustration, FIG. 2 shows a migration workflow for a container (tintin) with a data volume. Similar workflows can be implemented for migrating rootfs. With one or more embodiments of the invention, a migration can be classified into one of multiple phases that can include, for example, data federation, lazy copy, and failover.

Referring to FIG. 2, source host 202 is provisioned with a block device 220 (direct-attached or SAN-attached) formatted with a filesystem 212. Similarly, target host 204 is also provisioned with a block device 222 formatted with a filesystem 232. Container 206, identified by name 'tintin,' is first instantiated on source host 202, and is then migrated to target host 204. For container 206 on source host 202, the container's rootfs 208 is mapped to a directory 214 (identified as /var/tintin) from the host 202 local filesystem 212. The container 206 is also provisioned with a data volume 210 (identified as /vol1) which is a local directory 216 (identified as /home/tintin) on the host's filesystem 212.

Referring again to FIG. 2, the directory on the source host 202 which is mapped to a data volume is added to the NFS export (as shown by step/arrow "A" in FIG. 2). On the target host 204, this exported directory is then mounted ( . . . /tintin_nfs 226, as shown by step/arrow "B" in FIG. 2), and referred to as a remote directory. A new COW directory ( . . . /tintin_cow 230) is created on the target host filesystem 232. Then, a unified namespace is created across these two directories using an AUFS union filesystem (as shown by step/arrow "C" in FIG. 2), and referred to as fedfs 228. As noted in FIG. 2, the remote directory 226 is marked as a read-only branch while the COW directory 230 is a read-write (or read/write) branch.

For every file read in the fedfs 228, if the file is present in the COW directory 230, it is read therefrom; else, the file is read from the remote directory 226. Every new write to the fedfs 228 is stored in the COW directory 230. While for update operations, the file is copy-on-written; that is, the file is read from the remote directory 226 and written to the COW directory 230. For deletes, only the metadata are updated locally in the AUFS. Writes are typically latency-prone and many applications require writes in write-through mode. In one or more embodiments of the invention, writes are performed on the container host locally, which ensures maximum possible performance with a marginal overhead of union filesystem. By mounting NFS with client-side caching, at least one embodiment of the invention can also include optimizing on the file reads over NFS. After completing the above-detailed data federation phase successfully, the container 206 is stopped at the source host 202 and started at the target host 204 using the same image (as shown in step/arrow "D" in FIG. 2). Thus, there is no downtime during this phase.

The lazy copy phase is initiated after the container is started. In this phase, files which are not modified by the application are copied to target VMs. First, the remote directory is crawled to get a list of all files/directories at the source data volume 210. This list is provided to a replicator 240 to copy over rsync to the target host 204 (as shown in step/arrow "G" in FIG. 2). The replicator 240 copies and stores these files at target host 204 in a separate directory 236 (identified as /home/tintin). If the application modifies a file, the file will be copied to the COW directory 230. Hence, inotify 238 is started on the COW directory 230 to monitor the files which are copied through copy-on-write (as shown in step/arrow "E" in FIG. 2). As used herein, inotify represents a Linux kernel sub-system that acts to extend filesystems to notice changes to the filesystem, and report those changes to applications. These files are continuously fed to the replicator 240 (as shown in step/arrow "F" in FIG. 2), which removes the files from the list (if not copied already). In one or more embodiments of the invention, a user can also provide a policy with an explicit file list and/or a file-pattern that the user wants to avoid copying. For example, a user can set a policy to ignore copying *.log files. Moreover, during this lazy copy phase, replication can be dynamically throttled during peak load.

Once the lazy copy phase completes, the failover phase is initiated. During this phase, all of the files from the COW directory 230 are moved (that is, renamed) to the final volume directory. Also, during this failover phase, the container needs to be stopped, which mandates a downtime. But, because a file rename primarily involves filesystem metadata changes, downtime can be, for example, on the order of 2-5 seconds. Upon successful completion of the failover phase, at least one embodiment of the invention includes marking migration as complete and starting the container 206 again on the target host 204. Post-failover, all of the application input/output (IO) operations (such read, write, update, and/or delete operations) are carried out on the host locally.

As also illustrated in FIG. 2, at least one embodiment of the invention includes creating a COW union filesystem on the target host 204 between an original filesystem (NFS server) 218 on the source host 202 and a new COW storage (NFS client) 224 on the target host 204. Such an embodiment includes exporting an original data directory from the source host 202 over the NFS server 218, mounting the directory at the target host 204, and creating an empty directory on the target host 204 to store new writes. Additionally, as detailed herein, a union can be made with these two filesystem (for example, with an AUFS), with the NFS mount-path as read-only and the other as read-write. Further, a container can be launched with the AUFS directory as a data volume. The container will be able to access (that is, read) all original data from the source host 202 and any new writes/updates will create a COW replica on the target host 204.

Further, in one or more embodiments of the invention, a filesystem monitor can be launched to find the files that have been updated by the container and are already copied to the target host 204 over the COW filesystem. As noted herein, the identification of any such files is provided to the replicator 240, which removes such files from the replication list. Additionally, the replicator 240 also copies the un-changed files from the source host 202 to the target host 204, and stores the copied files to a final directory path on the target host 204. Also, at least one embodiment of the invention includes merging the COW directory and the final directory on the target host 204. At this point, complete data migration to the target host 204 will have been carried out, and the container can be started again (after taking downtime, as noted herein) with the directory path equaling the final directory.

Additionally, at least one embodiment of the invention can include an alternate implementation (to that illustrated in FIG. 2) with rsync. Using rsync utility with different filtering options (for example, compare-dest), at least one embodiment of the invention can include comparing NFS-mounted directory 224 and COW directory 232, and differentially copying the unique files to component 234.

As also detailed herein, one or more embodiments of the invention can include dual mode replication. In an in-band mode, data replication happens through copy-on-write, and is moderated by the application itself (with the rate at which the application modifies the data). In an out-of-band mode, the data are explicitly lazy copied (as detailed herein), and can be controlled through user policy and/or dynamically as per the system load. Furthermore, each mode can operate over different network interfaces, thus avoiding any interference.

Further, as also noted herein, at least one embodiment of the invention is filesystem-agnostic, as NFS and AUFS are used in the data path only during migration. Post-failover, they are removed from the data path, and containers start using filesystem from a host directly. Additionally, during high peak, there can be a need to scale container applications across clouds. In one or more embodiments of the invention, in cloud-burst mode, the failover phase of the migration is avoided and containers at both source and target hosts continue to run.

Figure 3:
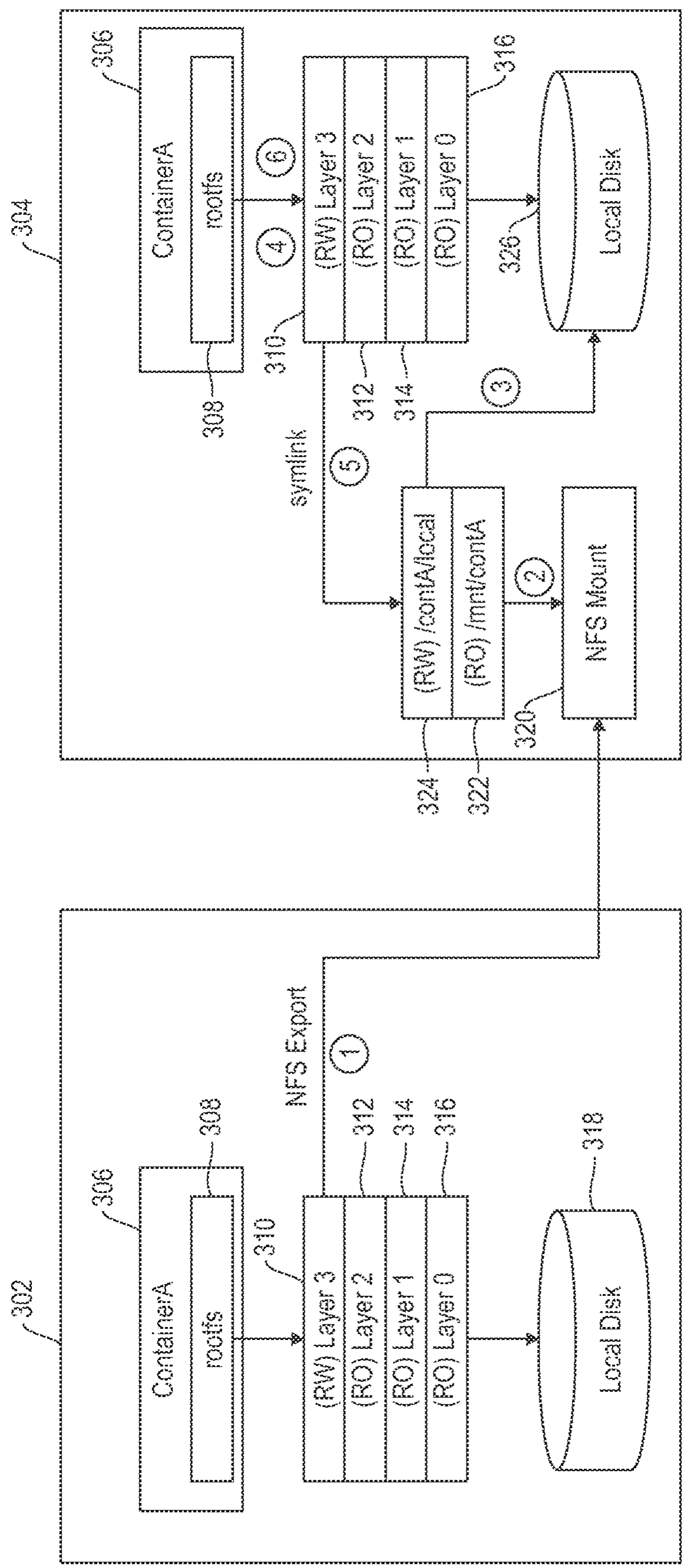
FIG. 3 is a diagram illustrating migration of a rootfs for a container, according to an example embodiment of the invention.

FIG. 3 is a diagram illustrating migration of a rootfs 308 for a container 306, according to an example embodiment of the invention. Source host 302 is provisioned with a block device 318 (which can be local direct-attached or SAN-attached). A rootfs, as detailed above, is a layered filesystem that has a top layer that is 'write-able' (COW), and therefore all changes in the rootfs are only localized in the top-most layer 310. All layers below (such as layer 312, layer 314 and layer 316) are read-only and will be available on the target host 304 as a part of the image. Accordingly, in one or more embodiments of the invention, there is a need only to copy, export and/or migrate the top layer 310 from the source host 302 to the target host 304.

As illustrated in FIG. 3, step/arrow 1 includes an NFS export of the top-layer 310 of the rootfs 308 from the source host 302 to the target host 304, while step/arrow 2 includes an NFS mount 320 for the exported path on the target host 304. Component 322 represents the mount path for this NFS mounted directory (identified as /mnt/contA) on host 304. Step/arrow 3 includes creating a local write-able directory on the target host local disk/filesystem 326 and AUFS mount with the NFS exported directory as read-only. Further, step/arrow 4 includes creating the container 306 which internally will also create a rootfs filesystem 308 on the target host 304, and step/arrow 5 includes generating and/or establishing a symbolic link (symlink) between only the top write-able layer of the container rootfs 310 and the AUFS mounted directory 324. Additionally, step/arrow 6 includes instantiating the container 306 on the target host 304.

Figure 4:
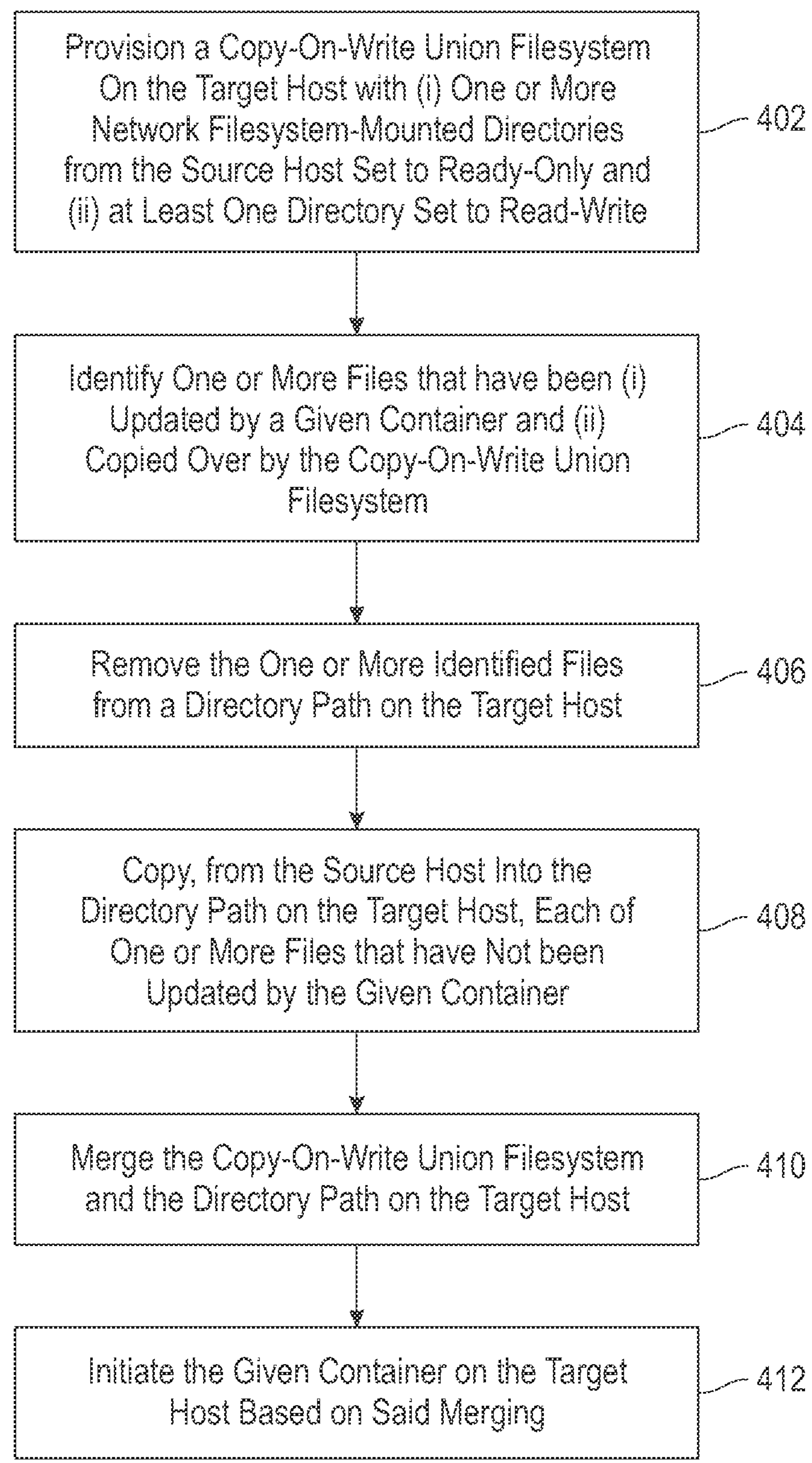
FIG. 4 is a flow diagram illustrating techniques according to an embodiment of the invention.

FIG. 4 is a flow diagram illustrating techniques according to an embodiment of the present invention. Step 402 includes provisioning a copy-on-write union filesystem on the target host with (i) one or more network filesystem-mounted directories from the source host set to read-only and (ii) at least one directory set to read-write. Provisioning can include using an advanced multi-layered unification filesystem. Also, at least one embodiment of the invention can additionally include exporting at least one root filesystem directory from the source host to the target host and exporting at least one data volume directory from the source host to the target host.

Step 404 includes identifying one or more files that have been (i) updated by a given container and (ii) copied over by the copy-on-write union filesystem. Identifying can include using a filesystem monitoring tool. The given container can include a new container launched prior to the identifying step. Alternatively, the given container can include a container derived from the source host that is restarted after migration from the source host, wherein the container derived from the source host includes the copy-on-write union filesystem as data volume.

Step 406 includes removing the one or more identified files from a directory path on the target host. Step 408 includes copying, from the source host into the directory path on the target host, each of one or more files that have not been updated by the given container. The removing and copying steps can be carried out by a replicator module. Additionally, in one or more embodiments of the invention, the copying step is performed as a background operation.

Step 410 includes merging the copy-on-write union filesystem and the directory path on the target host. Step 412 includes initiating the given container on the target host based on said merging.

The techniques depicted in FIG. 4 can also include creating a directory to receive one or more write operations from the source host, and mounting the one or more write operations that are exported over a network filesystem on the source host into the created directory. Additionally, the techniques depicted in FIG. 4 can be host filesystem and container technology agnostic. Also, such techniques can additionally be used to migrate container storage across container hypervisors, as well as used in hybrid cloud environments and in Cloud-bursting scenarios.

Figure 5:
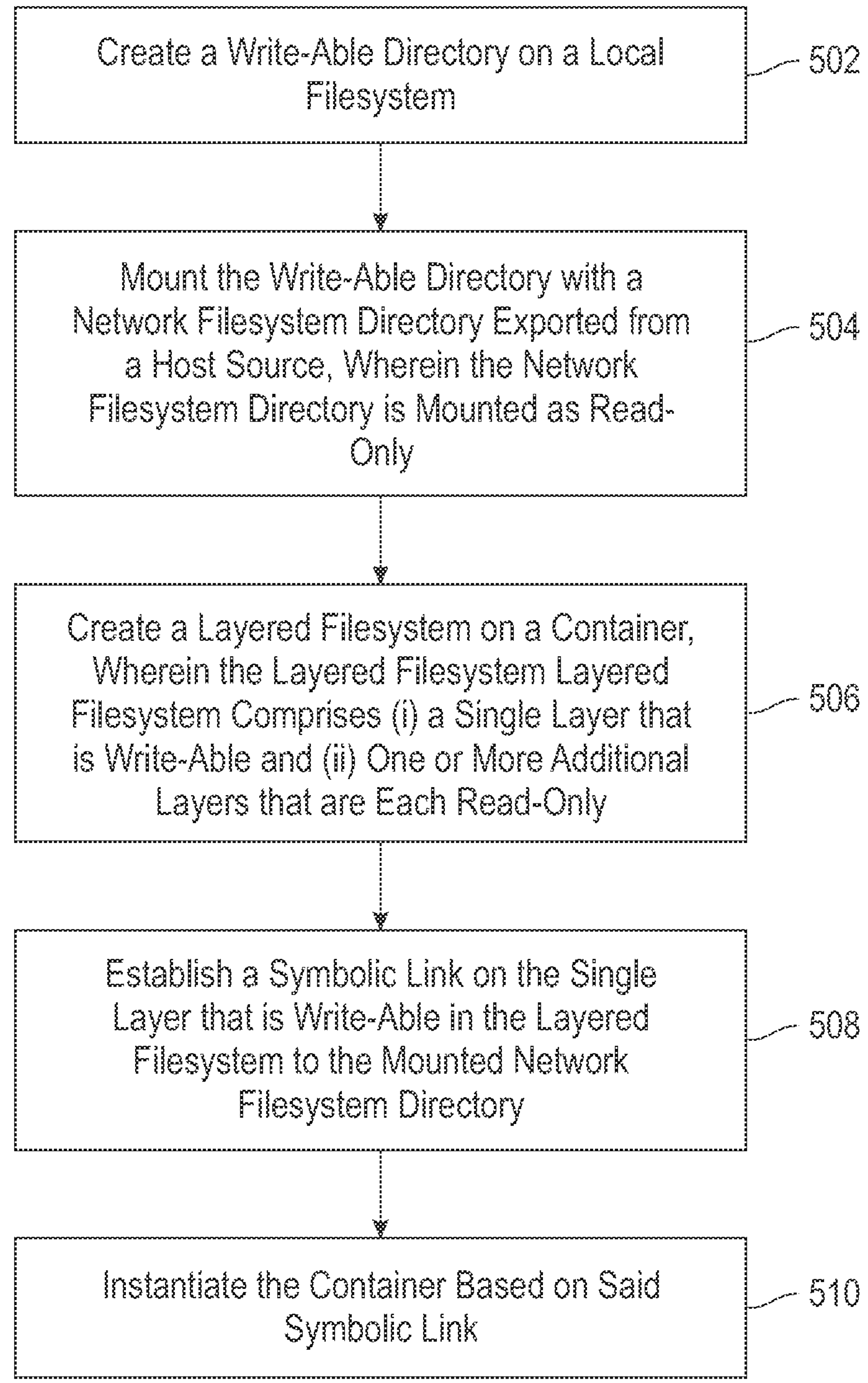
FIG. 5 is a flow diagram illustrating techniques according to an embodiment of the invention.

FIG. 5 is a flow diagram illustrating techniques according to an embodiment of the present invention. Step 502 includes creating a write-able directory on a local filesystem. Step 504 includes mounting the write-able directory with a network filesystem directory exported from a host source, wherein the network filesystem directory is mounted as read-only. The network filesystem directory exported from the host source can include a single layer that is write-able in a layered filesystem on a container in the host source.

Step 506 includes creating a layered filesystem on a container, wherein the layered filesystem comprises (i) a single layer that is write-able and (ii) one or more additional layers that are each read-only. Step 508 includes establishing a symbolic link on the single layer that is write-able in the layered filesystem to the mounted network filesystem directory. Step 510 includes instantiating the container based on said symbolic link.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
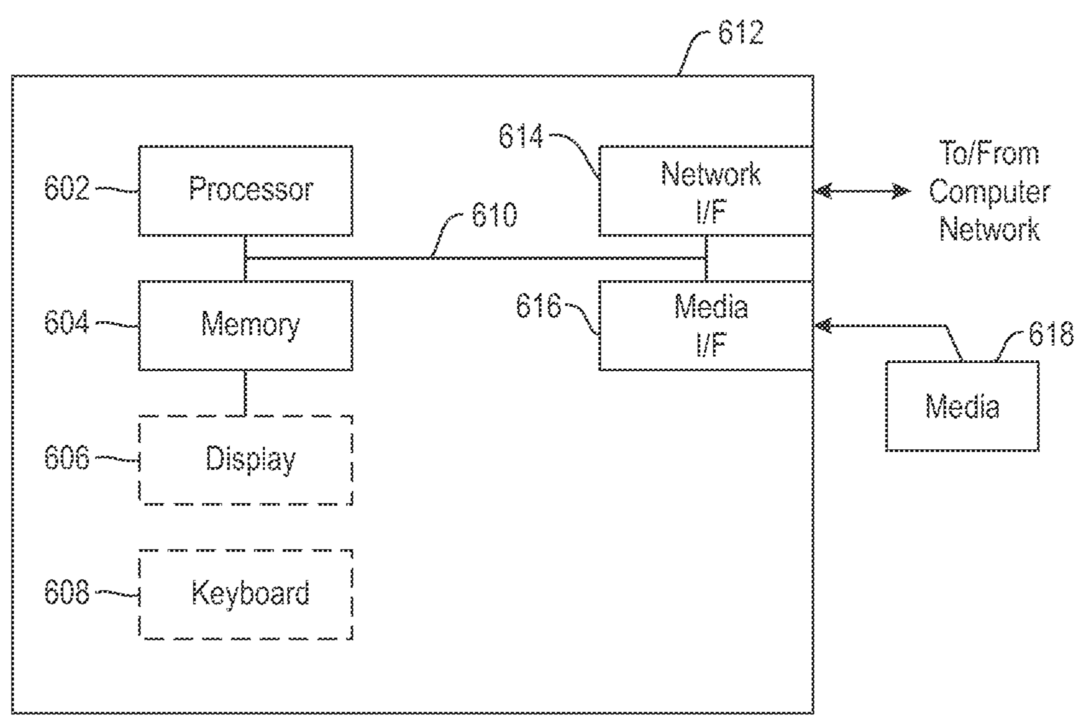
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, exporting directories to be migrated on the source host over an NFS and creating new directories on the target host for receiving new writes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating a container from a source host to a target host, comprising:

provisioning a copy-on-write union filesystem on the target host with (i) one or more network filesystem-mounted directories from the source host set to read-only and (ii) at least one directory set to read-write;

identifying one or more files that have been (i) updated by a given container and (ii) copied over by the copy-on-write union filesystem;

removing the one or more identified files from a directory path on the target host;

copying, from the source host into the directory path on the target host, each of one or more files that have not been updated by the given container;

merging the copy-on-write union filesystem and the directory path on the target host; and initiating the given container on the target host based on said merging;

wherein said steps are carried out by at least one computing device.

2. The computer-implemented method of claim 1, wherein said copying is performed as a background operation.

3. The computer-implemented method of claim 1, comprising:

exporting at least one root filesystem directory from the source host to the target host.

4. The computer-implemented method of claim 1, comprising:

exporting at least one data volume directory from the source host to the target host.

5. The computer-implemented method of claim 1, comprising:

creating a directory to receive one or more write operations from the source host.

6. The computer-implemented method of claim 5, comprising:

mounting the one or more write operations that are exported over a network filesystem on the source host into the created directory.

7. The computer-implemented method of claim 1, wherein said provisioning comprises using an advanced multi-layered unification filesystem.

8. The computer-implemented method of claim 1, wherein said identifying comprises using a filesystem monitoring tool.

9. The computer-implemented method of claim 1, wherein said given container comprises a new container launched prior to said identifying.

10. The computer-implemented method of claim 1, wherein said given container comprises a container derived from the source host that is restarted after migration from the source host.

11. The computer-implemented method of claim 10, wherein the container derived from the source host includes the copy-on-write union filesystem as data volume.

12. The computer-implemented method of claim 1, wherein said removing is carried out by a replicator module.

13. The computer-implemented method of claim 1, wherein said copying is carried out by a replicator module.

14. A computer program product for migrating a container from a source host to a target host, the computer program product comprising a computer readable storage medium having program instructions embodied therewith, the program instructions executable by a device to cause the device to:

provision a copy-on-write union filesystem on the target host with (i) one or more network filesystem-mounted directories from the source host set to read-only and (ii) at least one directory set to read-write;

identify one or more files that have been (i) updated by a given container and (ii) copied over by the copy-on-write union filesystem;

remove the one or more identified files from a directory path on the target host;

copy, from the source host into the directory path on the target host, each of one or more files that have not been updated by the given container;

merge the copy-on-write union filesystem and the directory path on the target host; and initiate the given container on the target host based on said merging.

15. The computer program product of claim 14, wherein the program instructions executable by a computing device further cause the computing device to:

create a directory to receive one or more write operations from the source host.

16. The computer program product of claim 15, wherein the program instructions executable by a computing device further cause the computing device to:

mount the one or more write operations that are exported over a network filesystem on the source host into the created directory.

17. The computer program product of claim 14, wherein said given container comprises a new container launched prior to said identifying and/or a container derived from the source host that is restarted after migration from the source host.

18. A system for migrating a container from a source host to a target host comprising:

a memory; and at least one processor coupled to the memory and configured for:

provisioning a copy-on-write union filesystem on the target host with (i) one or more network filesystem-mounted directories from the source host set to read-only and (ii) at least one directory set to read-write;

identifying one or more files that have been (i) updated by a given container and (ii) copied over by the copy-on-write union filesystem;

removing the one or more identified files from a directory path on the target host;

copying, from the source host into the directory path on the target host, each of one or more files that have not been updated by the given container;

merging the copy-on-write union filesystem and the directory path on the target host; and initiating the given container on the target host based on said merging.

19. A computer-implemented method, comprising:

creating a write-able directory on a local filesystem;

mounting the write-able directory with a network filesystem directory exported from a host source, wherein the network filesystem directory is mounted as read-only;

creating a layered filesystem on a container, wherein the layered filesystem comprises (i) a single layer that is write-able and (ii) one or more additional layers that are each read-only;

establishing a symbolic link on the single layer that is write-able in the layered filesystem to the mounted network filesystem directory; and instantiating the container based on said symbolic link;

wherein said steps are carried out by at least one computing device.

20. The computer-implemented method of claim 19, wherein the network filesystem directory exported from the host source comprises a single layer that is writeable in a layered filesystem on a container in the host source.

* * * * *